US012800235B2

(12) United States Patent
Magaldi et al.

(10) Patent No.: US 12,800,235 B2
(45) Date of Patent: Nov. 17, 2026

(54) SYSTEM AND METHOD FOR THERMAL ENERGY STORAGE AND TRANSFER BASED UPON A BED OF FLUIDIZED PARTICLES

(71) Applicant: MAGALDI POWER S.P.A., Rome (IT)

(72) Inventors: Mario Magaldi, Rome (IT); Alberto Carrea, Rome (IT); Fulvio Bassetti, Rome (IT)

(73) Assignee: MAGALDI POWER S.P.A., Rome (IT)

( * ) Notice: Subject to any disclaimer, the term of this patent is extended or adjusted under 35 U.S.C. 154(b) by 166 days.

(21) Appl. No.: 18/685,956

(22) PCT Filed: Aug. 30, 2021

(86) PCT No.: PCT/IT2021/000043
§ 371 (c)(1),
(2) Date: Feb. 23, 2024

(87) PCT Pub. No.: WO2023/031975
PCT Pub. Date: Mar. 9, 2023

(65) Prior Publication Data

US 2024/0353183 A1 Oct. 24, 2024

(51) Int. Cl.
*F28D 20/00* (2006.01)
*F28D 20/02* (2006.01)
*F24S 20/20* (2018.01)

(52) U.S. Cl.
CPC ....... *F28D 20/0056* (2013.01); *F28D 20/021* (2013.01); *F24S 2020/23* (2018.05)

(58) Field of Classification Search
CPC ........ F28D 20/00; F28D 20/02; F28D 20/021; F28D 20/0056
See application file for complete search history.

(56) References Cited

U.S. PATENT DOCUMENTS 3,672,069 A 6/1972 Reh et al.
4,111,158 A 9/1978 Reh et al.
2013/0104549 A1* 5/2013 Stiesdal .................. F28F 27/02
165/104.31

FOREIGN PATENT DOCUMENTS

EP 2984435 B1 * 9/2017 ........... F28D 20/003
IT 201800021301 A1 6/2020
(Continued)

OTHER PUBLICATIONS

International Search Report and Written Opinion for Corresponding International Application No. PCT/IT2021/000043, 8 pages, Apr. 29, 2022.

*Primary Examiner* — Harry E Arant
(74) *Attorney, Agent, or Firm* — LUCAS & MERCANTI, LLP

(57) ABSTRACT

A heat storage and transfer method, having: providing a plurality of heat storage and transfer modules, arranged thermally in series, each module of the plurality having a bed of fluidizable solid particles as a heat storage and transfer means; adducting a flow of a heat transfer fluid (HTF) to cross the modules in serial thermal sequence; fluidizing each of the beds of fluidizable solid particles so as to foster heat exchange between the bed particles with said heat transfer fluid, the arrangement being such that the heat transfer fluid can cross the modules in sequence according to opposite directions, to transfer or extract thermal energy, respectively, from the beds of particles.

21 Claims, 8 Drawing Sheets

(56) References Cited

FOREIGN PATENT DOCUMENTS

| | | | |
|---|---|---|---|
| WO | 2011135501 | A2 | 11/2011 |
| WO | 2017021832 | A1 | 2/2017 |

* cited by examiner

SYSTEM AND METHOD FOR THERMAL ENERGY STORAGE AND TRANSFER BASED UPON A BED OF FLUIDIZED PARTICLES

CROSS-REFERENCE TO RELATED APPLICATIONS

This application is a 371 of PCT/IT2021/000043, filed Aug. 30, 2021.

FIELD OF THE INVENTION

The present invention relates mainly to a system and method for thermal energy storage and transfer based upon a bed of fluidized/fluidizable particles.

BACKGROUND AND TECHNICAL BASIS OF THE INVENTION

There are known thermal energy storage systems based upon a fluidized or fluidizable bed of solid particles having high thermal capacity. Examples of devices, plants and methods based upon said technology are disclosed, e.g., in WO2011135501A2 and WO2017021832A1, which mainly employ solar power to heat the bed solid particles.

In the above-mentioned systems, heat exchangers are generally immersed into the fluidized bed, so that the thermal energy storage and transfer functions can be integrated into a same device. This configuration has the advantage, over other technologies as based, e.g., upon molten salts, that several separate equipment are not needed.

In the simplest configuration of the fluidized bed technology, the entire fluid bed—due to its high thermal diffusivity—can be assumed to be isothermal, i.e. equated to a mass wherein all particles have the same temperature. In this case, thermal energy is stored in the fluid bed in the form of sensible heat of solid particles, given by:

$$Q = m * c_p * \Delta T \qquad \text{(formula 1)}$$

wherein:

- Q is the thermal energy stored in the fluid bed,
- m is the total mass of the fluid bed particles,
- $c_p$ is the specific heat of the particles material,
- $\Delta T$ is the difference ($T_{max}-T_{min}$) of solid particles temperatures, where $T_{min}$ and $T_{max}$ are respectively the minimum and maximum operating temperature of the fluid bed.

FIG. 1 exemplifies the heat exchange steps occurring in a thermal energy storage system based upon a fluid bed module as per the above mentioned known thermal energy storage systems, which is charged with thermal energy by a Heat Transfer Fluid (HTF) and/or electricity and is able to release heat after a certain storage time.

This configuration, while ensuring high heat transfer rates thanks to the fluid bed properties, poses limits in both the energy charging and discharging phases, as explained herebelow.

Charging Phase

In case the fluid bed, e.g. made of sand particles, is charged by a heat transfer fluid, for example high temperature steam available during certain periods of time, the typical trends of the temperature values of the fluidised bed, inlet steam and outlet steam during a thermal energy charging phase is represented in the diagram of FIG. 2.

During the charging phase, steam will typically:

- enter the fluid bed module at a high temperature, normally constant (continuous horizontal line in the diagram),
- cross the in-bed heat exchangers, progressively heating up isothermally the fluid bed sand (lower line),
- exit the fluid bed module, at a temperature which increases during time, along with the progressive increase of the fluid bed sand temperature (intermediate line).

Due to the progressive increase of the fluid bed temperature during the charging time, the difference of inlet steam temperature and fluid bed temperature becomes smaller and smaller: as shown in FIG. 2 it is higher at the beginning of the charging phase (left vertical arrow in the diagram) and smaller at the end (right vertical arrow). As a consequence, the heat transfer from high temperature steam to the bed particles becomes smaller and smaller during the charging time. This fact constitutes a limit in the operation and performance of the thermal energy storage system, since the latter does not extract and store the entire potential heat content of the steam. In some circumstances, for example, the arrangement considered cannot be able to recover the latent heat of the steam, which means that the stored heat is only a limited portion of the enthalpy available in the inlet steam and that a remaining portion of available heat is wasted (if not otherwise used in other parts of the plant).

Discharging Phase

Given the above, when the fluidised bed has been charged with energy, heat can be released from it to a heat transfer fluid (HTF), such as steam, $CO_2$, supercritical $CO_2$, or other, by means of heat exchangers immersed in the fluidised bed.

The produced HTF temperature, of course, is always lower than the fluid bed temperature and it can be subject to downstream adjustments (e.g. by means of steam de-superheaters) in order to meet the conditions desired for the use.

For better understanding, the diagrams of FIGS. 3 to 5 exemplify possible temperature trends of the fluid bed mass and of the heat transfer fluid (e.g. steam), in a case where $T_{min}$ is assumed at 350 °C, $T_{max}$ at 620 °C and steam generation time is 6 hours.

In particular, FIG. 3 shows a steam temperature constantly decreasing along with the solid particles temperature decrease, FIG. 4 shows a steam generation profile constant at 500 °C for the first two hours and then a decreasing one, along with the solid particles temperature decrease, and FIG. 5 shows a steam generation constant at 300 °C for the entire transfer period.

In any case, the above diagrams show that the HTF is produced, at least for an interval of time, at a temperature below the fluid bed minimum temperature (in the example $T_{min}$=350 °C).

In other words, for an application where the HTF is needed at, for example, 500 °C constantly, the solution shown above cannot work, unless the sand minimum temperature is increased above 500 °C (e.g. at 530 °C). However, such increase would have a strong negative impact upon the thermal storage capacity, since the solid particle operational $\Delta T$ would be reduced significantly. To stay in the example above, $\Delta T$ would be reduced from (620-350°) C=270 °C to (620-530°) C=90 °C, which means that the thermal storage capacity would be reduced to ⅓, if steam must be produced at 500 °C rather than at 300 °C.

Theoretically, said temperature gap could be recovered by increasing the fluid bed maximum temperature ($T_{max}$, in formula 1), but this increase may be not feasible and/or not economical, particularly because of the operational limits of materials the in-bed heat exchangers are made of. Making reference, again, to the example above, in order to produce steam constantly at 500 °C, by adopting fluid bed minimum temperature ($T_{min}$) at 530 °C and keeping the same thermal energy storage capacity, the fluid bed maximum temperature should raise from 620 °C up to 800 °C (i.e. 530+ΔT=530+270=800 °C), which may be unpracticable due to the properties of the material of construction used for the heat exchangers.

Another possible countermeasure to keep the same thermal storage capacity, when producing steam at higher temperature (e.g. 500 °C) would be to increase the solid particle mass, but again, that would involve much larger modules (in the example, three times larger), with a significant cost increase.

The above considerations are even more important in case the HTF is, for example, supercritical $CO_2$, which is nowadays expected to be able to drive a turbine with thermal to electric efficiency up to 50%, provided that supercritical $CO_2$ is delivered to the turbine at temperature over 700 °C (and pressure over 200 bar).

In these cases, the fluid bed should be working in a very high temperature range (for example, from 730 °C up 1000 °C), which, even if possible for the solid particles, could make the realization of the immersed heat exchangers not feasible, or their lifetime too short, due to the material limits to operate at such levels of temperature and pressure.

Of course, in general it is desirable to allow a TES system to be able to recover and store as much energy as possible from the available charging sources, thus maximising its storage capacity, and to release stored heat at the highest temperature, in order to enlarge the range of possible application and, particularly, to allow for high efficiency processes when requested, such as in the cases of energy re-conversion processes from heat to electricity.

SUMMARY OF THE INVENTION

The technical problem posed and solved by the present invention is therefore to provide a heat storage and transfer configuration based upon a bed of fluidized solid particles which overcomes one or more of the drawbacks mentioned above with reference to the state of the art.

Said problem is solved by a system according to claim 1 and by a method according to claim 14.

Preferred features of the invention are the object of the dependent claims.

As mentioned above, the present invention aims at overcoming performance limits intrinsically associated with thermal energy storage and transfer configurations based upon fluidized beds of solid particles equipped with in-bed heat exchangers.

The system according to the invention provides a plurality of fluidized particle beds arranged in series for heat storage and transfer. Each of said bed realizes a module in the heat storage and transfer system. Advantageously, each module is obtained as one compartment of several thermal energy compartments arranged in series within a same casing.

A Heat Transfer Fluid (HTF) is fed into the system in such a way that it crosses the compartments, or in general the modules, in series.

A preferred configuration is such that the heat transfer fluid can cross the modules in sequence according to opposite directions, to charge or extract thermal energy, respectively, into/from the beds of particles.

In a basic configuration, the heat transfer fluid operates in sequence through the modules only to extract thermal energy, going from a lower temperature bed to a higher temperature bed. In this case, charging of the beds with thermal content can be done with other heat transfer means, e.g. of electric nature.

The mass of heat storage particles in each compartment may be the same or a dedicated one.

Each compartment can be operated at different ranges of particles temperature.

In one, or more, module or compartment, additional heat exchangers for charging thermal energy into the bed may be provided.

The HTF may be, e.g., high temperature steam for heat charging and water for heat discharging.

The HTF flow direction across the compartments during charging phase is, generally speaking, opposite to that of the discharging phase.

The invention is applicable with configurations wherein charging of thermal power is made by electricity, a heat transfer fluid, waste heat or solar energy, or by combination of them, i.e. with hybrid solutions.

The invention is specifically applicable to configurations wherein heat is provided to each module or compartment also by electric resistors or the like, e.g. as disclosed in WO2020/136456A1.

Other advantages, features and use modes of the present invention will result evident from the following detailed description of some embodiments, provided by way of example and not with limitative purpose.

BRIEF DESCRIPTION OF THE DRAWINGS

Reference will be made to the figures of the annexed drawings, wherein:

FIGS. 6A and 68 show schematic representations, in lateral sectional view and plan view, respectively, of a thermal energy storage and transfer configuration according to a first embodiment of the present invention;

FIGS. 8A and 88 show schematic representations, in lateral sectional view and plan view, respectively, of a thermal energy storage and transfer configuration according to a third embodiment of the present invention;

DETAILED DESCRIPTION OF PREFERRED EMBODIMENTS OF THE INVENTION

Several embodiments and variants of the invention will be described below, with reference to the figures already introduced.

Generally speaking, analogous components are indicated in the various figures using corresponding reference numbers. In particular, five embodiments are presented below, wherein the reference numbers of the components for each embodiment have as first digit “1” to “5”, respectively, the following two digits remaining the same for homologous or similar elements.

Further embodiments and variants other than those already described will be explained solely in conjunction with the most relevant differences with respect to the preceding ones.

Moreover, the features of the various embodiments and variants described below are to be understood as combinable, where compatible.

Figure 1:
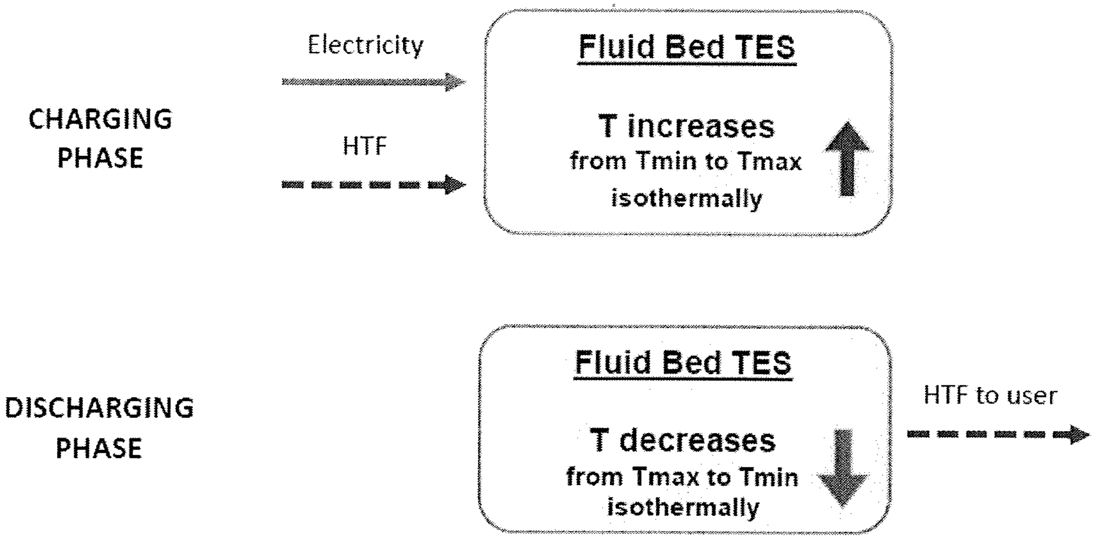
FIGS. 1 to 5 have already been introduced above in explaining the technical basis of the present invention.
Figure 2:
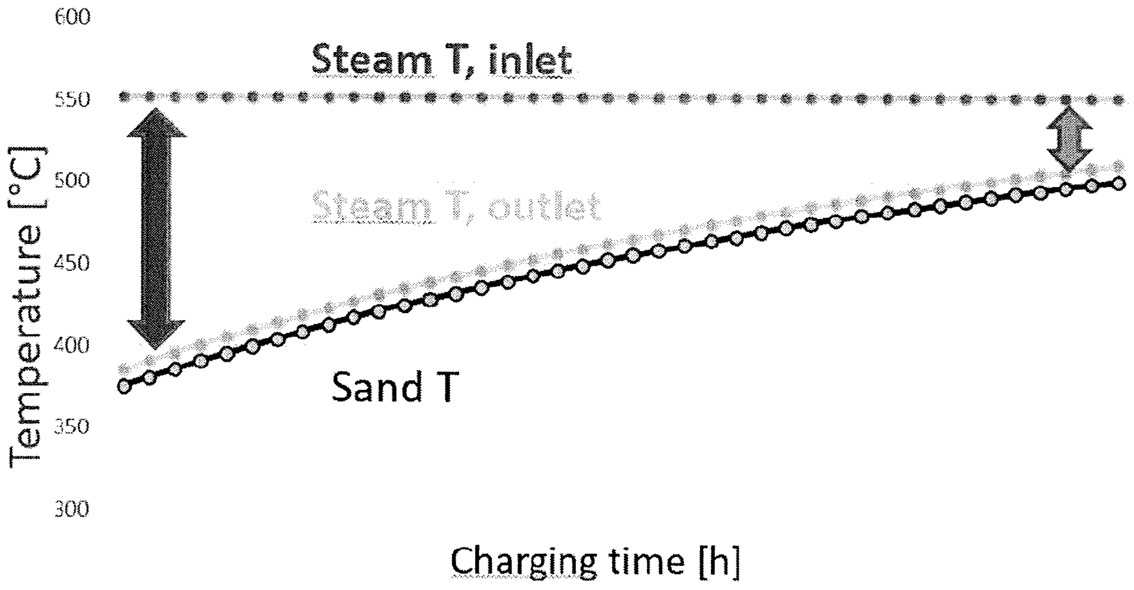
Figure 3:
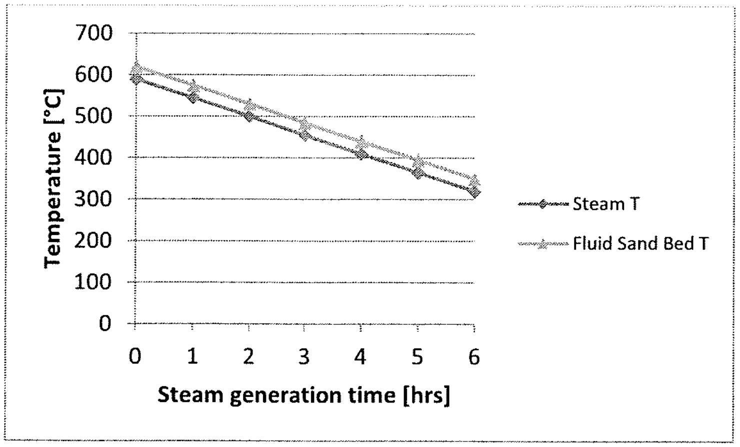
Figure 4:
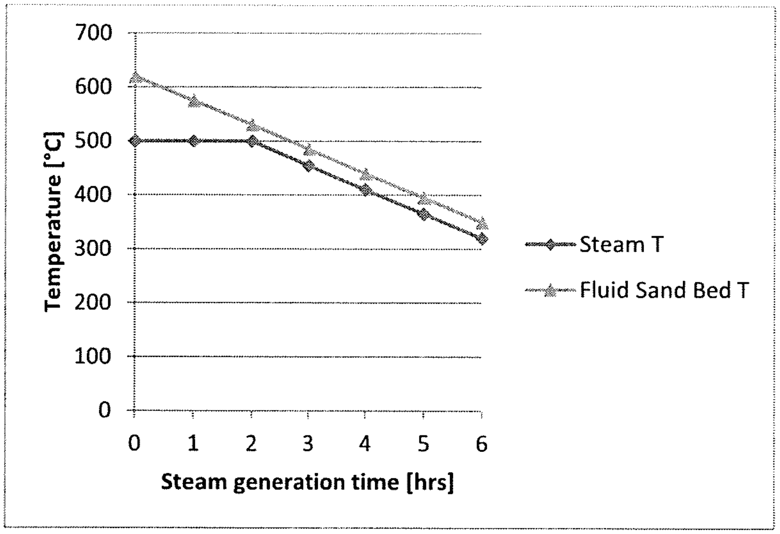
Figure 5:
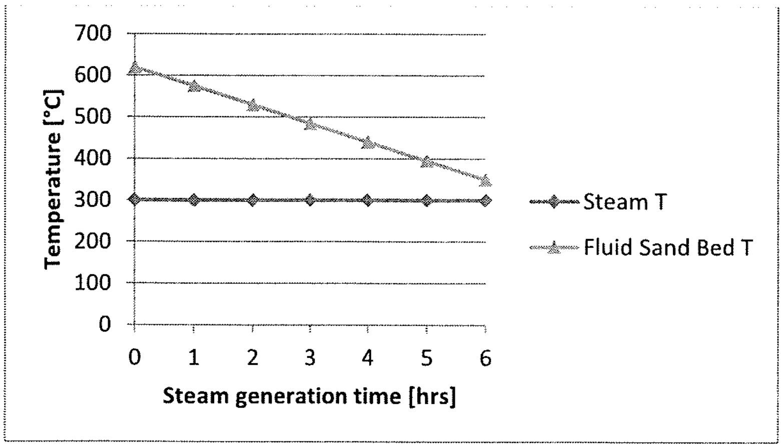
Figure 6A:
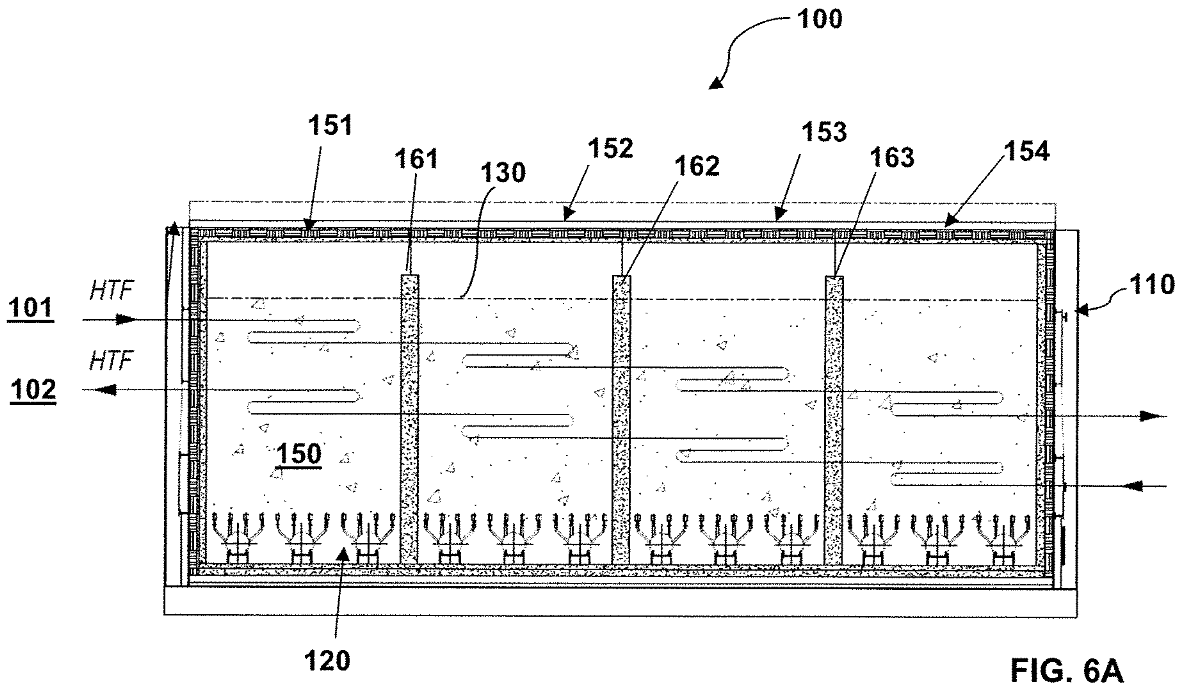
Figure 6B:
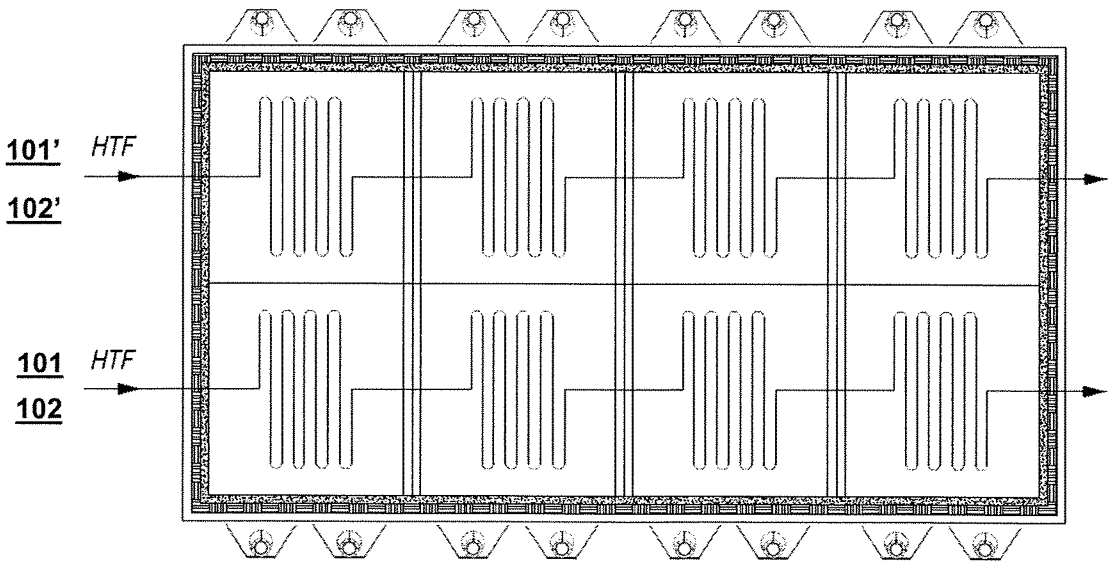

With reference, initially, to FIGS. 6A and 6B, a system, or device, for thermal energy storage and transfer according to a first embodiment of the invention is globally denoted by 100.

The system 100 comprises four heat storage and transfer modules, or compartments or cells, denoted by reference numbers from 151 to 154, respectively. The modules 151-154 are arranged thermally in series within a common casing 110. The casing 110 is preferably equipped with a thermal insulation lining suitable to minimise heat losses to the external environment.

Adjacent modules in the thermal sequence are separated by thermally-insulating partitions, or walls, denoted by 161-163, respectively, so as to allow maintaining a difference in the operating temperature among the compartments.

Each module comprises a bed of fluidizable solid particles, denoted by way of example with 150 for the first module 151. The bed of particles, in particular sand particles, acts as a thermal energy storage and transfer means, as will be explained shortly below.

In use, the particles of each bed are fluidized by fluidization means, denoted by way of example with 120 for the first module 151, which adducts a fluidization gas, in particular air, into the beds. The fluidization means comprises a respective fluidization unit for each module. In particular, a fluidization air distribution device is arranged at the floor of each compartment, in such a way to allow independent control of gas distribution among the modules.

In the present embodiment, the partitions 161-163 allow a fluid communication of the fluidization gas between the environments of the various compartments above a free surface 130 of the beds, i.e. the gas adducted into one bed, after crossing it longitudinally, can merge with the fluidization gas in other modules. Therefore, each partition 161-163 extends above the free surface 130 of the beds, but below a roof, or top wall or part, of casing 110. In the present example, the longitudinal (vertical) level of the free surface 130 is the same for each module, as well as the width of each compartment (distance between adjacent partitions) is the same.

The fluidization means is configured to adduct a flow of fluidization gas into the bed of each module, so as to foster heat exchange between the bed particles and a heat transfer fluid (HTF) flowing within heat transfer means. The latter, shown as 101, 102 in FIG. 6A, are immersed in the particle beds and arranged to cross said modules 151-154 in serial thermal sequence.

The transfer means may include one or more conduits.

The HTF may be steam, $CO_2$, supercritical $CO_2$, hot air, flue gas or other.

In the embodiment shown, the heat transfer means comprises a first circuit, or conduit means, 101, 101' configured to charge thermal energy to the bed of each module, and a second circuit or conduit means, 102, 102', configured to extract thermal energy from the bed of each module. The second circuit 102, 102' is arranged to cross said beds in countercurrent with respect to the first circuit 101, 101' as shown by arrows in FIG. 6A.

The counter-current circuits 101, 101' and 102, 102' can be activated simultaneously or alternatively, depending upon the specific thermal needs of the plant the system 100 is included in.

Generally speaking, each HTF circuit can be divided in more sub-circuits, arranged in parallel, in order to provide the desired input/output power.

As can be appreciated from the plan view of FIG. 6B, in the present embodiment each first and second circuit comprises a couple of conduits, denoted by 101, 101' for the first one and by 102, 102' for the second one, arranged thermally, and in the example shown also geometrically, in parallel so as to perform a same heat charging or heat extraction operation.

In operation, the first circuit 101, 101' charges thermal energy to the beds so that the first bed in the sequence is brought to the higher temperature and the last bed of the sequence to the lowest temperature. In general, each intermediate bed in the sequence has a temperature lower than the preceding one and higher than the following one. The reverse occurs in the sequence of beds that is crossed in the thermal energy extraction process.

Figure 7A:
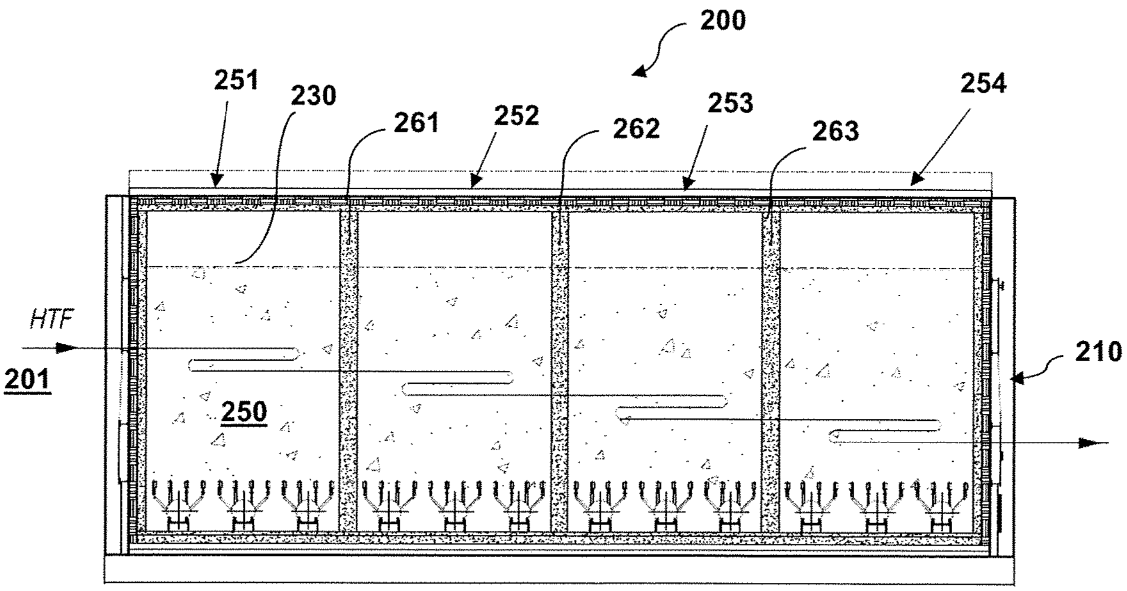
FIGS. 7A and 7B show schematic representations, in lateral sectional view and plan view, respectively, of a thermal energy storage and transfer configuration according to a second embodiment of the present invention.
Figure 7B:
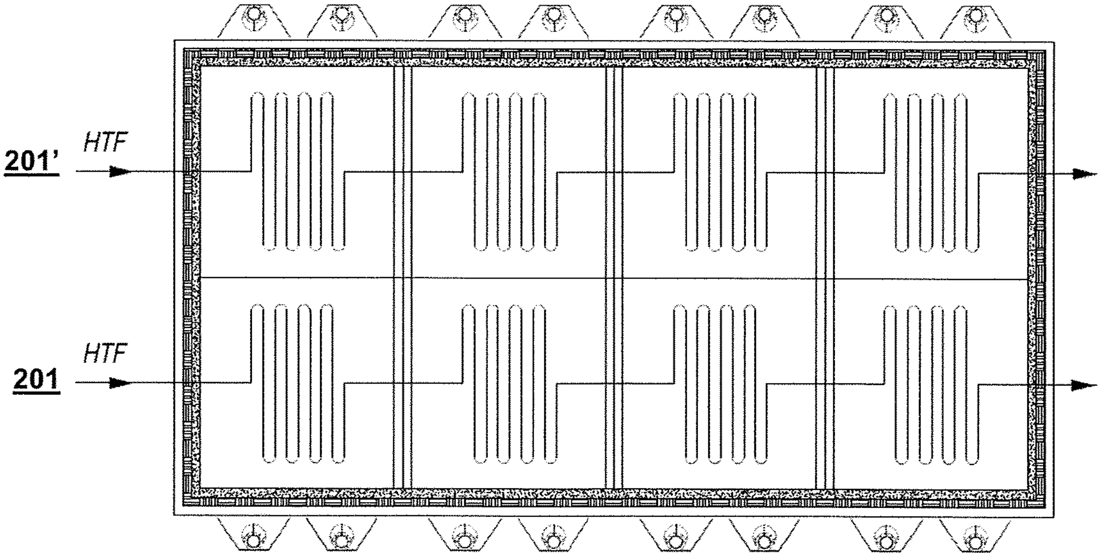

A second embodiment of the system according to the invention, globally denoted by 200, is shown in FIGS. 7A and 7B. In this case, the heat transfer means comprises a single circuit, or conduit means, 201, 201' configured for being crossed, alternatively, in opposite directions by the heat transfer fluid, so as to act alternatively as a heat charging circuit and a heat extraction circuit for each module.

This embodiment has the advantage of a more compact and cost-effective solution when compared to the first embodiment. It may be applied when the thermal energy charging and discharging phases of the beds do not need to be simultaneous.

In the embodiment of FIG. 7A, the partitions, denoted by 261-263, impede fluid communication between the environments hosting each bed (the latter denoted by 250 for the first module 251). In particular, the partitions 261-263 are elevated to the roof of the fluidized bed casing 210.

Considering that the fluidization air flow leaving each compartment has typically the same temperature of the fluid bed mass of that compartment (due to the generally small amount of air compared to the fluid bed mass), the present arrangement allows keeping the different fluidization air flows separated and to maintain their different temperature values. The separate flow of gas exiting from the free surface of the beds can be handled independently or jointly by means known in the art.

Figure 8A:
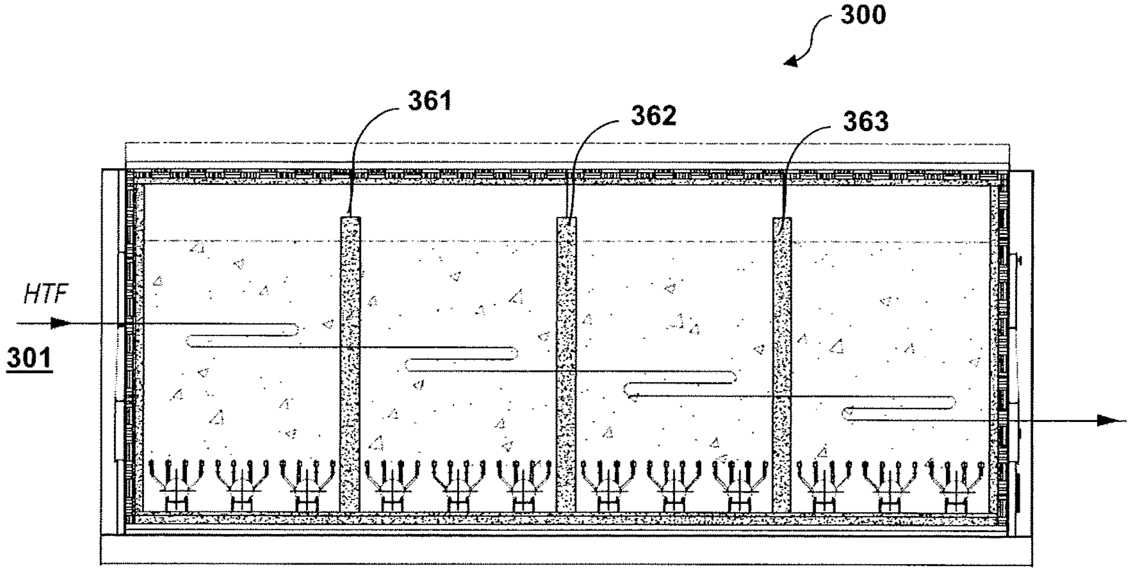
Figure 8B:
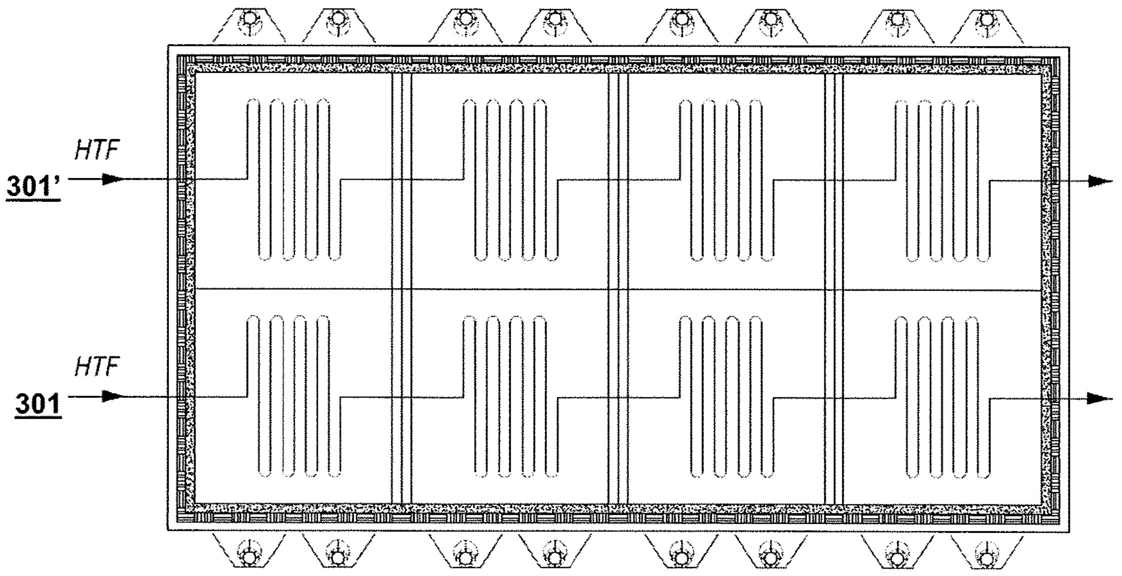

FIGS. 8A and 8B refer to a third embodiment 300 which combines the previous ones, in that partitions 361-363 allow fluid communication between modules and a single circuit, or conduit means, 301, 301' is provided.

Figure 9A:
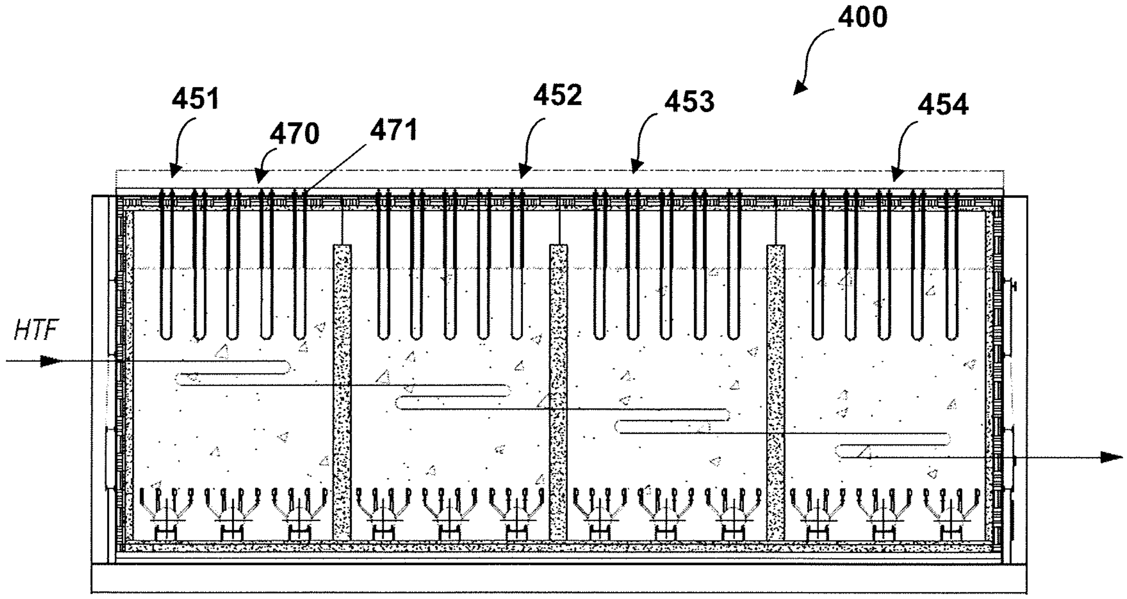
FIGS. 9A and 9B show schematic representations, in lateral sectional view and plan view, respectively, of a thermal energy storage and transfer configuration according to a fourth embodiment of the present invention.
Figure 9B:
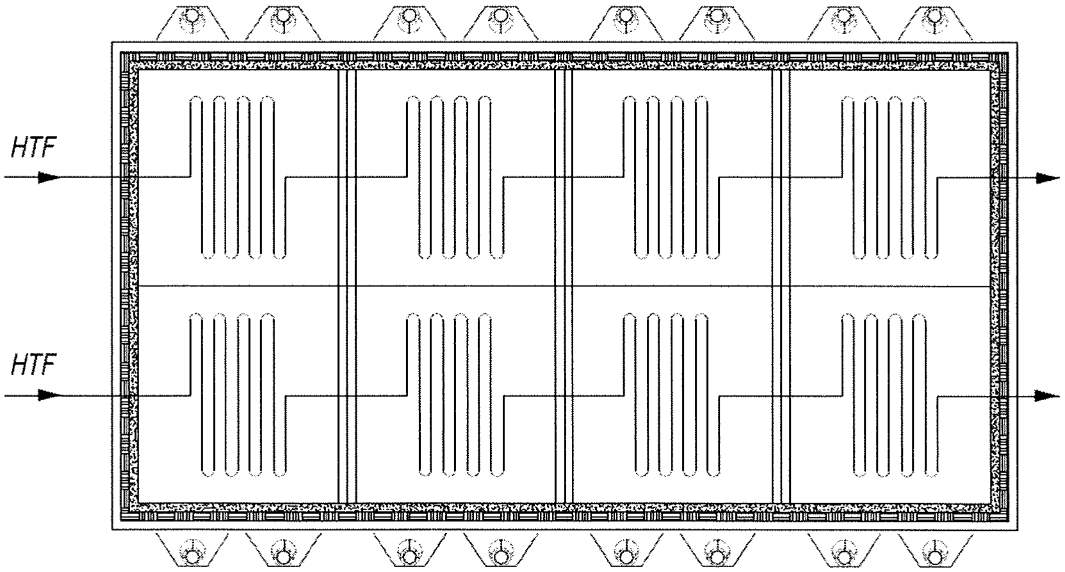

FIGS. 9A and 9B relate to a fourth embodiment 400, compatible with the configurations of each of the previous ones, wherein each module 451-454 comprises additional heat charging means, denoted by way of example with 470 for the first module 451, configured to charge thermal energy to the bed of particles.

In the present example, the additional heat charging means are electric heaters 471, in particular electric resistors, at least partially immersed in the beds of particles and generating heat by Joule effect.

Figure 10A:
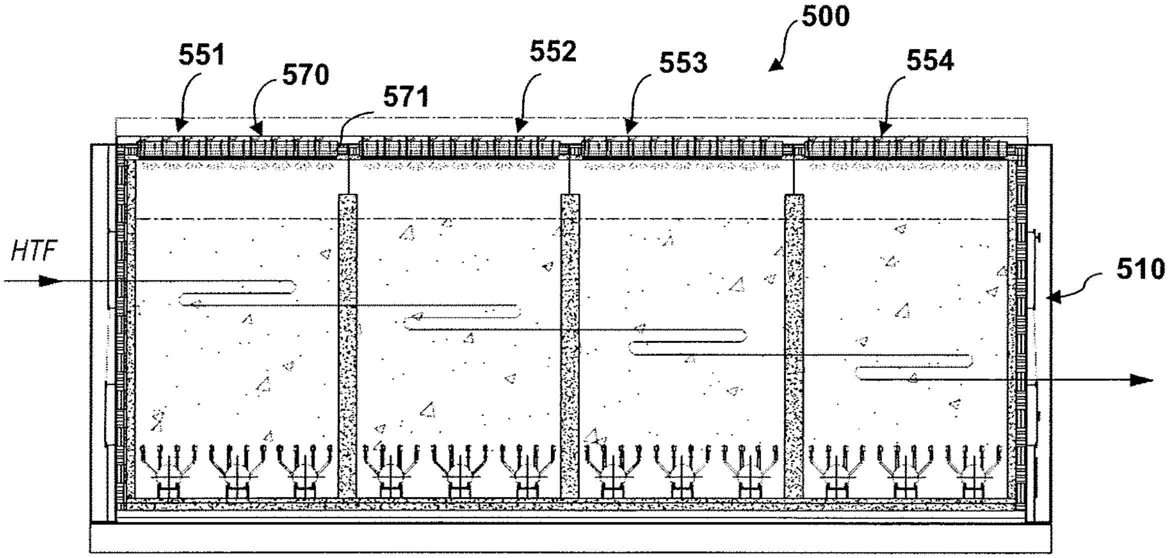
FIGS. 10A and 10B show schematic representations, in lateral sectional view and plan view, respectively, of a thermal energy storage and transfer configuration according to a fifth embodiment of the present invention.
Figure 10B:
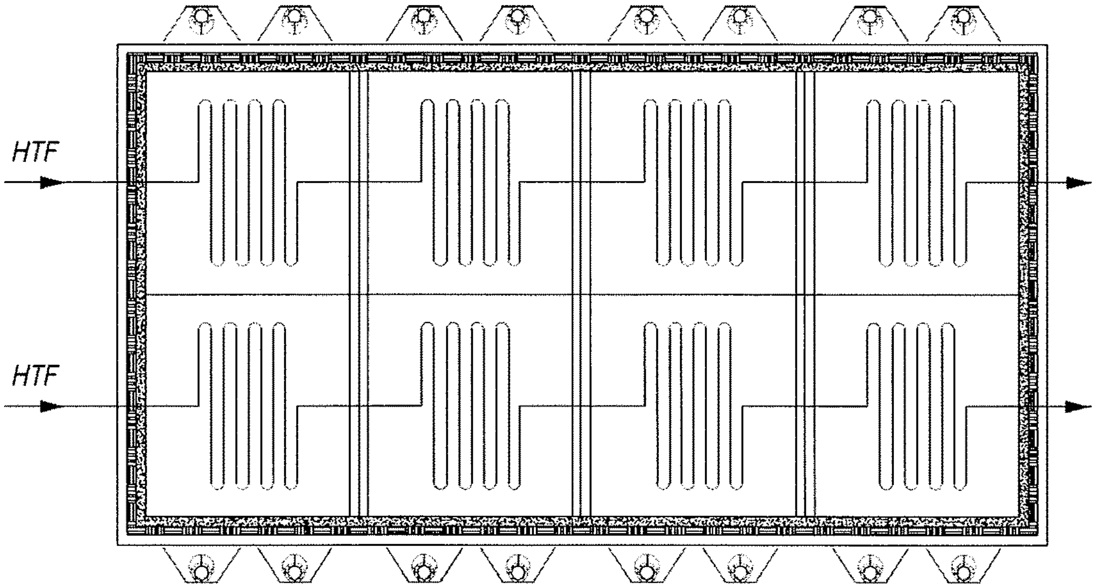

FIGS. 10A and 10B relate to a fifth embodiment 500, compatible with the configurations of each of the previous ones, wherein each module 551-554 comprises additional heat charging means, denoted by way of example with 570 for the first module 551, configured to charge thermal energy to the bed of particles and arranged at a top part of the common casing 510. In the present example, the additional heat charging means are electric radiant panels 571 facing the beds of particles.

Variant embodiments may provide additional heat charging means in form of solar energy—based exchanger means.

In the embodiments employing the additional heat charging means, the bed of each compartment can be charged with thermal energy by means of said additional heating means in combination with the HTF or, in selected operational phases wherein thermal power from HTF is not available, by the additional heating means alone.

Moreover, in case of hybrid charging, i.e. by electricity and by the HTF, energy charging by electrical heaters and high temperature HTF can be simultaneous or not, according to the availability of said energy sources during time and to their economic convenience (i.e. charging when electricity and HTF costs are low).

Operation of the system of the invention according to the embodiments disclosed above will now be explained in greater detail.

In each of the above embodiments, during a charging phase high temperature HTF (e.g. high temperature steam) enters the first module, or compartment, releasing part of its energy to the fluid bed, then exits the first compartment and enters the second one, releasing part of its residual energy and so on. By continuing to the third and following compartments arranged in the series, heat from the HTF is progressively released to the storage fluid bed, until the HTF thermal content is preferably exhausted. In this way, the temperature profile along the compartments progressively decreases from the first compartment to the last one in the series. As a consequence, thanks to the mentioned multi-compartment module arrangement, a higher amount of thermal energy can be transferred from the HTF to the storage fluid bed, compared to the case with a single isothermal module of the aforementioned prior art, keeping unchanged the total fluid bed particles mass.

For example, in case the charging phase is made by superheated steam, the multi-compartment module arrangement allows cooling down the steam progressively and condensate it in order to recover, partially or totally, its latent heat content, which means that the stored heat can be significantly higher compared to the single isothermal module case.

During a discharging phase, the cold HTF (e.g. feedwater) enters the last compartment, the coldest in the series, and is there heated up by the fluid bed sand; then, the HTF exits the last compartment and enters the second last one, which operates at higher temperature than the previous one, thus the HTF can be further heated up and so on. By crossing the next compartments, the HTF is progressively heated up until it reaches the first compartment.

As a consequence of said discharging mode of the multi-compartment arrangement, a higher temperature HTF can be generated, for a longer time, compared to the case with a single isothermal module, thus enabling the accomplishment of a wider range of thermal processes and, also, the possibility to convert the heat of the generated HTF into electricity by means of more effective cycles.

For example, the multi-compartment arrangement allows heating up, evaporating and superheating feedwater progressively in the fluid bed compartments series, allowing generation of higher temperature steam compared to the single isothermal unit case.

Each of the above embodiments can be used in a heat storage and transfer method, comprising the following main steps:

- providing a plurality of heat storage and transfer modules, arranged thermally in series,
- each module of said plurality comprising a bed of fluidizable solid particles as a heat storage means;
- adducting a flow of a heat transfer fluid (HTF) to cross said modules in serial thermal sequence to charge thermal energy therein, or providing thermal energy to the beds with other means, in such a way that each (intermediate) bed of the sequence has a temperature lower than the preceding one and higher than the following one;
- fluidizing each of said beds of fluidizable solid particles so as to foster heat exchange between the bed particles with said heat transfer fluid or with the other heat charging means.

A preferred arrangement is such that the heat transfer fluid is used also to extract thermal energy from the modules. In this case, the heat transfer fluid can cross the modules in sequence according to opposite directions, to charge or extract thermal energy, respectively, into/from the beds of particles.

Charging heat in the modules can also be done in combination by the HTF and by other sources, like electricity.

The selected HTF arrangement and/or the alternative heat sources allows bringing each module at the desired operating temperature.

Following the above description, several design parameters can be selected to optimise storage cycles capabilities and HTF generation, such as the number of compartments, the particle mass in each compartment, the in-bed heat exchange surface, the heat charging and discharging phases duration, the HTF flow rate, the temperature in each compartment and the possibility for hybrid charging of the beds by HTF and electricity.

Numerical Examples

Serial Arrangement of Fluid-Bed Compartments

Figure 11:
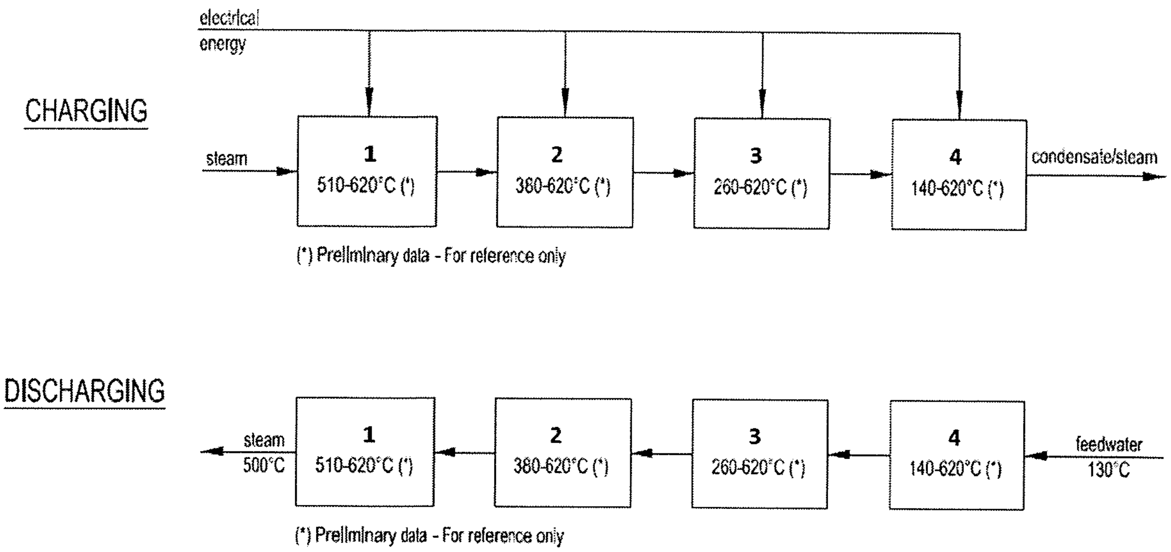
FIG. 11 shows a diagrammatic representation of the thermal behaviour of a charging and discharging cycle in an exemplary thermal energy storage and transfer configuration according to an embodiment of the present invention.

As an example, FIG. 11 shows the scheme of a fluidized bed system, with four compartments in series. In this example, the fluid bed mass can be assumed the same in each compartment and it can be noted that:

- maximal particle (sand) temperature is the same for all modules (e.g. at 620 °C), due, for instance, to a combination of energy charging, such as electricity plus superheated steam;
- a different minimum sand temperature is used in each module:
  - from a sand temperature $T_{1,min}$ in in module 1 (higher than the desired outlet steam temperature, e.g. $T_{1,min}$>500 °C)
  - to a lower temperature $T_{4,min}$ in module 4 ($T_{4,min}$ higher than feedwater temperature, e.g. $T_{4,min}$>130 °C)
- $\Delta T$ ($T_{max}-T_{min}$) increases from compartment 1 to 4.

As shown in FIG. 11, charging of energy happens by process steam which enters compartment 1 (e.g. at 550 °C) and undergoes a progressive cooling across the compartments, which may allow condensation of steam until compartment 4. Heat released by the steam across the compartments is captured by the fluid bed mass in each compartment and is there stored. Thermal energy storage capacity is different in each compartment and shows an increasing profile from compartment 1 to compartment 4, in association to the increasing $\Delta T$ profile.

In addition to heat charging by steam, electricity can be used (simultaneously or not) to increase, by Joule effect, the fluid bed temperature of each compartment up to the desired value (for example 620 °C) and, correspondingly, relevant heat storage capacity.

During thermal energy storage discharge, water enters (for example at 130 °C) compartment 4 and undergoes there a first step of heating, then exits compartment 4 and enters compartment 3, with a second step of heating, and so on until it exits compartment 1, as steam at the desired temperature (for example 500 °C).

The series of compartment, in this way, allow a progressive heating of the produced HTF during discharging phase: this is made possible by the progressively higher values of the solid particles minimum temperature $T_{min}$.

The maximum operating temperature ($T_{max}$) in each module, same or different among modules, can be decided according to the need and in compliance with the availability of the heating sources (electricity, waste heat, or other).

The system total heat storage capacity $Q_{tot}$ will be given by adding the single heat storage capacities of each module i, as per formula below.

$$Q_{tot} = \sum_{1}^{n} Q_i = \sum_{1}^{n} m_i * c_{p,i} * \Delta T_i \quad \text{(formula 2)}$$

wherein in the present case i=(1, . . . , 4).

In a system based on such configuration, as said, several parameters can be combined to realize the desired energy charging, storage and discharging cycles, such as the number of compartments, the heat charging and discharging phases duration, the fluid bed mass in each compartment, the in-bed heat exchange surface in each compartment, the HTF flow rate and quality during charging and discharging phases, the operational fluid bed temperatures temperature ($T_{min}$, $T_{max}$) in each compartment and, in case of hybrid charging by HTF and electricity, the electric power in each compartment.

Comparison Between Multi-Compartment Vs Single-Compartment Arrangement

To better appreciate the advantages of the multi-compartment solution according to the invention compared to the "conventional" single compartment, in this section some non-limitative numerical examples are given.

A first case is analysed, as a "Heat to Heat" configuration, where the fluidized bed energy storage system is charged by heat, available as superheated steam, and after a certain storage time, stored thermal energy is released to generate steam again.

A comparison is made between the single-compartment vs the multi-compartment, assuming for the latter a division in 2, 4 and 6 compartments. In this comparison, the same boundary conditions have been assumed, namely:

| | |
|---|---|
| Steam quality, charge phase: | 555 °C/60 bar |
| Steam flow rate, charge phase: | 20 kg/s |
| Steam quality, discharge phase: | 300 °C/30 bar |
| Feedwater temperature: | 146 °C |
| Total fluid bed mass: | 500 tons |
| Total in-bed heat exchange surface: | 600 $m^2$ |
| Duration of charge phase: | 5 h |
| Duration of discharge phase: | 5 h |

The following Table 1 shows the operational temperature range ($T_{min}$, $T_{max}$) of each compartment, where compartment 1 is where steam is introduced for thermal charging and last compartment is where feedwater is introduced for steam generation during discharge, in countercurrent to the charging steam flow.

TABLE 1

| | Single Compartment | Multi Compartment | | |
|---|---|---|---|---|
| Number of compartments | 1 | 2 | 4 | 6 |
| Sand temperature regime (°C) - Comp. 1 | 477-295 | 520-319 | 538-374 | 546-407 |
| Sand temperature regime (°C) - Comp. 2 | | 461-221 | 516-262 | 531-294 |
| Sand temperature regime (°C) - Comp. 3 | | | 484-232 | 513-254 |
| Sand temperature regime (°C) - Comp. 4 | | | 446-191 | 491-237 |
| Sand temperature regime (°C) - Comp. 5 | | | | 467-213 |
| Sand temperature regime (°C) - Comp. 6 | | | | 443-176 |
| Thermal energy storage capacity (MWh, t) | 33.9 | 40.8 | 43.0 | 43.4 |
| Increase in storage capacity (%) | | 20.4 | 26.8 | 28.0 |
| Increase in steam flow rate generation (%) | | 20.4 | 26.8 | 28.0 |

Table 1 above shows that in the multi-compartment system a temperature gradient is created among the compartments: fluid bed temperature profile across the series of compartments decreases from the first to the last compartment, during charge and increases from last compartment to first one during discharge.

In this way, the heat content of charging steam is better utilized, in fact steam leaving the last compartment has an enthalpy which becomes lower and lower as the number of compartments increases, thus allowing a higher energy storage with higher number of compartments, keeping unchanged all the other boundary conditions.

Table 1 shows, particularly, the expected increase of the thermal storage capacity and of the generated steam flow rate provided by the multi-compartment solution, which, for this specific case, are evaluated as 20.4%, 26.8%, 28.0%, respectively for 2, 4 and 6 compartments.

A second case is now analysed, as a "Power to Heat" configuration, where the fluidized bed energy storage system is charged only by electricity, available at low cost at certain hours, typically due to overproduction of intermittent renewables such as PV and wind; after a certain storage time, stored thermal energy is released to generate high quality steam.

In this case, the comparison is made between a single compartment vs two multi-compartment solutions, for example with 2 and 6 compartments, with the same boundary conditions in all cases, specifically:

| | |
|---|---|
| Total fluid bed mass: | 3000 tons |
| Total in-bed heat exchange surface: | 3000 $m^2$ |
| Steam quality, discharge phase: | 500 °C/30 bar |
| Duration of charge phase: | 5 h |
| Duration of discharge phase: | 5 h |

Electricity for heating is charged at the maximum possible power, taking into in consideration parameters such as the heaters design limits (here assumed for example at 80 $kW/m^2$ of available surface) and the maximum design temperature limit of the fluid bed (in this example assumed at 620 °C).

Table 2 below shows some major results of this analysis. As it can be noted, in this example the limit of fluid bed design temperature (620 °C) and the need to produce high quality steam (500 °C/30 bar) cause, in the case of the single compartment solution, a limitation of the usable electric power for the electric heaters, well below their maximum allowable value (80 $kW/m^2$). The multi-compartment solution, on the contrary, allows an operational fluid bed temperature profile, in the compartments after the first one, which offers the possibility to install electric heaters reaching their full maximum allowable power, which is of course advantageous.

As a consequence, the expected thermal storage capacity and the generated steam flow rate are both higher in the case of the multi-compartment solution compared to the single-compartment one, as shown, for this specific example, in Table 2 below: particularly the increase over the single compartment solution is evaluated as 37.7% and 56.5%, respectively for the solution with 2 and with 6 compartments.

TABLE 2

| | Single Compartment | Multi Compartment | |
|---|---|---|---|
| Number of compartments | 1 | 2 | 6 |
| Sand temperature regime (°C) - Comp. 1 | 620-502 | 620-499 | 620-519 |
| Sand temperature regime (°C) - Comp. 2 | | 468-251 | 540-335 |
| Sand temperature regime (°C) - Comp. 3 | | | 491-277 |
| Sand temperature regime (°C) - Comp. 4 | | | 470-257 |
| Sand temperature regime (°C) - Comp. 5 | | | 453-237 |
| Sand temperature regime (°C) - Comp. 6 | | | 418-195 |
| Sand average temperature difference (°C) | 118 | 169 | 195 |
| Total electric heaters power (MW) | 27.7 | 38.2 | 44.1 |
| Thermal energy storage capacity (MWh, t) | 138 | 190 | 216 |
| Increase in storage capacity (%) | | 37.7 | 56.5 |
| Increase in steam flow rate generation (%) | | 37.7 | 56.5 |

The present invention has been described so far with reference to preferred embodiments. It is intended that there may be other embodiments which refer to the same inventive concept as defined by the scope of the following claims.

The invention claimed is:

1. A thermal energy storage and transfer system, comprising:

a plurality of heat storage and transfer modules, arranged in sequence and thermally in series, each module of said plurality comprising a bed of fluidizable solid particles as a heat storage means for storing thermal energy in the form of sensible heat of said solid particles;

heat charging means, arranged to charge thermal energy into each bed, the configuration being such that each bed is brought at an operating temperature lower than the preceding bed and higher than the following one;

heat extraction means, configured to host a flow of a heat transfer fluid (HTF) which crosses said modules in serial thermal sequence, the configuration being such that the heat transfer fluid extracts thermal energy from said beds, crossing the sequence of modules from a lowest temperature bed to a highest temperature bed;

fluidization means of each of said beds of fluidizable solid particles, configured to adduct a flow of fluidization gas into each of said beds, wherein the heat storage and transfer modules of said plurality share a common casing and are separated by thermally-insulating partitioning means, and wherein said partitioning means impedes any fluid communication of the fluidization gas between the environments hosting each of said beds.

2. A thermal energy storage and transfer method, comprising the following steps:

providing a plurality of heat storage and transfer modules, arranged in sequence and thermally in series, each module of said plurality comprising a bed of fluidizable solid particles as a heat storage means for storing thermal energy in the form of sensible heat of said solid particles, wherein the heat storage and transfer modules of said plurality share a common casing and are separated by thermally-insulating partitioning means, and wherein said partitioning means impedes any fluid communication of the fluidization gas between the environments hosting each of said beds;

charging thermal energy into each bed, in such a way that each bed is brought at an operating temperature lower than the preceding bed and higher than the following one;

adducting a flow of a heat transfer fluid to cross said modules in serial thermal sequence, in such a way that the heat transfer fluid extracts thermal energy from said beds, crossing the sequence of modules from a lowest temperature bed to a highest temperature bed.

3. The thermal energy storage and transfer system according to claim 1, wherein said heat charging means comprises a charging circuit, or conduit means, configured to host a flow of a heat transfer fluid which charges thermal energy into each of said beds and wherein said heat extraction means comprises an extraction circuit, or conduit means, configured to extract thermal energy from each of said beds.

4. The thermal energy storage and transfer system according to claim 3, wherein said extraction circuit is arranged to cross said beds in countercurrent with respect to said charging circuit.

5. The thermal energy storage and transfer system according to claim 1, wherein said heat charging means comprises one or more of: electric resistor means, radiant panels and solar energy-based exchangers means.

6. The thermal energy storage and transfer system according to claim 1, wherein the configuration is such that said heat transfer fluid crosses the modules in sequence according to opposite directions, to charge or extract thermal energy, respectively, into/from the beds.

7. The thermal energy storage and transfer system according to claim 1, comprising a single circuit configured for being crossed, alternatively, in opposite directions by a heat transfer fluid, so as to act alternatively as heat charging means and heat extraction means.

8. The thermal energy storage and transfer system according to claim 1, wherein said heat extraction means and/or said heat charging means comprises a plurality of conduits arranged in parallel so as to perform a same heat charging or heat extraction operation.

9. The thermal energy storage and transfer system according to claim 1, wherein at least one of said modules comprises additional heat charging means configured to charge additional thermal energy into the bed of said module.

10. The thermal energy storage and transfer system according to claim 9, wherein said additional heat charging means comprises one or more of: electric resistor means, radiant panels, solar energy-based exchangers means.

11. The thermal energy storage and transfer system according to claim 1, wherein the heat storage and transfer modules of said plurality share a common casing and are separated by thermally-insulating partitioning means.

12. The thermal energy storage and transfer system according to claim 11, wherein said partitioning means impedes any fluid communication of the fluidization gas between the environments hosting each of said beds.

13. The thermal energy storage and transfer system according to claim 1, wherein said fluidization means comprises a respective fluidization unit for each of said heat storage and transfer modules.

14. The thermal energy storage and transfer system according to claim 1, wherein said heat extraction means and/or said heat charging means comprises a couple of conduits arranged in parallel so as to perform a same heat charging or heat extraction operation.

15. The thermal energy storage and transfer method according to claim 2, the arrangement being such that the heat transfer fluid can cross the modules in sequence according to opposite directions, to transfer or extract thermal energy, respectively, from the beds.

16. The thermal energy storage and transfer method according to claim 2, comprising a step of fluidizing each of said beds so as to foster heat exchange between the bed particles with said heat transfer fluid or other heat charging means.

17. The thermal energy storage and transfer method according to claim 2, wherein a thermal energy charging operation from the heat transfer fluid to each of said beds occurs alternatively to a thermal energy extraction operation from said beds to said heat transfer fluid.

18. The thermal energy storage and transfer method according to claim 2, wherein a thermal energy charging operation from the heat transfer fluid to each of said beds occurs countercurrently to a thermal energy extraction operation from said beds to said heat transfer fluid.

19. The thermal energy storage and transfer method according to claim 2, wherein at least one of a thermal energy charging operation from the heat transfer fluid to each of said beds and a thermal energy extraction operation from said beds to said heat transfer fluid occurs by a plurality of conduits hosting the heat transfer fluid and arranged in parallel.

20. The thermal energy storage and transfer method according to claim 2, wherein said step of charging thermal energy is performed by using one or more of: electric resistor means, radiant panels and solar energy-based exchangers means.

21. The thermal energy storage and transfer method according to claim 2, comprising a further step of charging additional thermal energy into at least one of the beds by additional heat transfer means comprising one or more of: electric resistor means, radiant panels, solar energy-based exchangers means.

* * * * *